(12) United States Patent
Ding

(10) Patent No.: US 9,516,565 B2
(45) Date of Patent: Dec. 6, 2016

(54) PACKET SWITCHING DOMAIN HANDOVER METHOD AND SYSTEM FOR GSM TERMINAL

(75) Inventor: Jieying Ding, Shenzhen (CN)

(73) Assignee: ZTE MICROELECTRONICS TECHNOLOGY CO. LTD, Shenzhen (CN)

( * ) Notice: Subject to any disclaimer, the term of this patent is extended or adjusted under 35 U.S.C. 154(b) by 55 days.

(21) Appl. No.: 14/391,464

(22) PCT Filed: Jun. 28, 2012

(86) PCT No.: PCT/CN2012/077696
§ 371 (c)(1),
(2), (4) Date: Oct. 9, 2014

(87) PCT Pub. No.: WO2013/152564
PCT Pub. Date: Oct. 17, 2013

(65) Prior Publication Data
US 2015/0078336 A1    Mar. 19, 2015

(30) Foreign Application Priority Data
Apr. 9, 2012  (CN) .......................... 2012 1 0104664

(51) Int. Cl.
*H04W 36/36*    (2009.01)
*H04W 36/00*    (2009.01)
*H04W 56/00*    (2009.01)

(52) U.S. Cl.
CPC ..... *H04W 36/0083* (2013.01); *H04W 36/0072* (2013.01); *H04W 56/0045* (2013.01); *H04W 56/0005* (2013.01)

(58) Field of Classification Search
CPC ..................... H04W 36/0083; H04W 36/0072; H04W 56/0045; H04W 56/00
See application file for complete search history.

(56) References Cited

U.S. PATENT DOCUMENTS

| 6,804,212 B1* | 10/2004 | Vallstrom | ............. H04W 36/16 370/328 |
| 8,072,933 B2 | 12/2011 | Marinescu et al. | |
| 2010/0232327 A1 | 9/2010 | Kim et al. | |

FOREIGN PATENT DOCUMENTS

| CN | 1451250 | 10/2003 |
| CN | 101151936 | 3/2008 |

(Continued)

OTHER PUBLICATIONS

3GPP TSG-GERAN Meeting #25, GP-051687, Jun. 23, 2005, pp. 1-66.*

(Continued)

*Primary Examiner* — Ian N Moore
*Assistant Examiner* — Lakeram Jangbahadur
(74) *Attorney, Agent, or Firm* — Brooks Kushman P.C.

(57) ABSTRACT

A domain handover method and system for a GSM terminal are described, a terminal protocol stack receiving a handover command from a network side, and notifying a physical layer to release a physical channel with a current cell, sending a synchronization request to the physical layer, after receiving a fed-back synchronization acknowledgement message, sending the physical layer a residence request carrying a system message of a handover target cell from the network side, after receiving a residence acknowledgement message from the physical layer, sending the physical layer a handover request carrying a handover type and a range of TA values. The physical layer judges whether to continue the PS handover or not according to a parameter carried in the handover request and the stored TA value. When continuing the PS handover, the terminal protocol stack instructs the physical layer to establish a physical channel with the target cell.

17 Claims, 3 Drawing Sheets

(56) References Cited

FOREIGN PATENT DOCUMENTS

| | | | | |
|---|---|---|---|---|
| CN | 101711047 | | 5/2010 | |
| NZ | 248564 | * | 5/1996 | ............... H04L 7/00 |

OTHER PUBLICATIONS

International Search Report for PCT/CN2012/077696, English translation attached to original, Both completed by the Chinese Patent Office on Jan. 7, 2013, All together 5 Pages.
Extended European Search Report for European Application No. 12874135.2, Completed by the European Patent Office on May 7, 2015, 8 Pages.
Rexhepi et al. IEEE Globecom 2005, vol. 5, p. 2589-2593, "Handover of Packet-Switched Services in GERAN A/Gb mode."
3GPP TSG-GERAN Meeting No. 25, Siemens, Infineon Technologies, Nokia, Ericsson Jun. 20-24, 2005, 66 Pages, "Simplification of PS Handover procedure."

* cited by examiner

PACKET SWITCHING DOMAIN HANDOVER METHOD AND SYSTEM FOR GSM TERMINAL

CROSS-REFERENCE TO RELATED APPLICATION

This application is the U.S. national phase of PCT Application No. PCT/CN2012/077696 filed on Jun. 28, 2012, which claims priority to Chinese Patent Application No. 201210104664.3 filed on Apr. 9, 2012, the disclosures of which are incorporated in their entirety by reference herein.

TECHNICAL FIELD

The present document relates to the field of Global System for Mobile Communications (GSM) system handover, and more particularly, to a packet switching (PS) domain handover method and system for a GSM terminal.

BACKGROUND

With the optimization and upgrading of the GSM network, there are some areas in which the GSM network supports the R9 protocol, one of the new features added in the R9 protocol is to support the PS handover, and it needs to provide users with non-perceivable channel handover capability.

Prior to the version of R9, there is no protocol supporting the PS handover, and if the original channel quality deteriorates, it is necessary to switch the channel with the cell reselection method, that is, after the terminal detects that the original channel's quality deteriorates, the terminal itself initiates a reselection process; in the IDLE state, it synchronizes with the handover target cell, interacts with the handover target cell to acquire a system message of said handover target cell; and resides in the handover target cell according to the acquired system message of the handover target cell. Since it is time-consuming for the terminal interacting with the handover target cell to acquire the system message of said handover target cell, it will cause the entire reselection process interrupts the PS service for some time, for example, a user is downloading, and such download service will be interrupted for some time, which is not conducive to the user experience.

To make the terminal support the PS handover, the existing technical solutions usually modify the overall implementation of the terminal baseband chip and add all the codes that support this feature, which has a relatively large impact scope, which is not good for the system stability and increases the R&D and testing costs.

SUMMARY

The embodiment of the present document provides a packet switching (PS) domain handover method and system for a GSM terminal to solve the technical problem about how to achieve the PS domain handover of the terminal by only slightly changing the existing terminal.

The embodiment of the present document provides a packet switching (PS) domain handover method for a terminal, and said method comprising:

after a terminal protocol stack receiving a handover command from a network side, notifying a physical layer to release a physical channel with a current cell;

said terminal protocol stack sending a synchronization request message to said physical layer to instruct said physical layer to synchronize with the handover target cell;

after receiving a synchronization acknowledgement message from said physical layer, said terminal protocol stack sending a residence request message to said physical layer, and said residence request message carrying a system message of said handover target cell from said network side;

after residing in said handover target cell based on said system message of said handover target cell, said physical layer feeding back a residence acknowledgement message to said terminal protocol stack;

after receiving a residence acknowledgement message sent by said physical layer, said terminal protocol stack sending a handover request message to said physical layer, and said handover request message comprising a handover type and a range of TA values;

said physical layer judging whether to continue said PS handover or not according to a parameter contained in said handover request message and a currently stored TA value, and sending a judgment result to said terminal protocol stack;

when said judgment result is continuing said PS handover, said terminal protocol stack instructing said physical layer to establish a physical channel with said handover target cell.

Alternatively, the step of said physical layer judging whether to continue said PS handover or not according to said parameter contained in said handover request message and the currently stored TA value comprises:

if said handover type is an asynchronous handover, continuing said PS handover;

if said handover type is a synchronous handover, judging whether the currently stored TA value exceeds said range of TA values or not, if said currently stored TA value does not exceed the range of TA values, continuing said PS handover; if the currently stored TA value exceeds said range of TA values, terminating said PS handover.

Alternatively, beside of said handover type and said range of TA values, said handover request message sent by said terminal protocol stack to said physical layer further comprises an identifier indicating whether to allow to exceed said range of TA values;

if said handover type is a synchronous handover, judging whether said TA value is allowed to exceed said range or not, if said TA value is allowed to exceed said range, continuing said PS handover; if said TA value is not allowed to exceed said range, then judging whether said currently stored TA value exceeds said range of TA values or not, if said currently stored TA value does not exceed said range of TA values, continuing said PS handover; if said currently stored TA value exceeds said range of TA values, terminating said PS handover.

Alternatively, said currently stored TA value of said physical layer is equal to the TA value sent by said terminal protocol stack to said physical layer via said handover request message;

when said handover request message does not comprise said TA value, the currently stored TA value of said physical layer is equal to 1.

Alternatively, when said judgment result is terminating said PS handover, said method further comprises:

said terminal protocol stack reconfiguring said physical layer according to the TA value of said terminal in a handover source cell and a power control parameter.

Alternatively, at the same time of said physical layer receiving a notification from said terminal protocol stack and releasing said physical channel with said current cell, it further reporting the TA value in said current cell and said power control parameter to said terminal protocol stack;

When said judgment result is terminating said PS handover, said terminal protocol stack configuring said physical layer in accordance with the stored TA value and said power control parameter.

The embodiment of the present document provides a packet switching (PS) domain handover system, applied for a terminal, and said system comprising a terminal protocol stack module and a physical layer module, said terminal protocol stack module is configured to: after receiving a handover command from a network side, notify a physical layer module to release a physical channel with a current cell; as well as after knowing that said physical layer module releases said physical channel with said current cell, send said physical layer module a synchronization request message indicating said physical layer module to synchronize with said handover target cell; after receiving a synchronization acknowledgement message from said physical layer module, send a residence request message to said physical layer module, wherein said residence request message carrying a system message of said handover target cell from said network side; receive a residence acknowledgment message fed back from said physical layer module; after receiving said residence acknowledgment message sent by said physical layer module, send a handover request message to said physical layer module, and said handover request message comprising a handover type and a range of TA values; receive a judgment result fed back by said physical layer module about whether to continue said handover or not, and when said judgment result is to continue said PS handover, said terminal protocol stack module instructing said physical layer module to establish a physical channel with said handover target cell;

said physical layer module is configured to: release said physical channel with said current cell, and notify the releasing result to said terminal protocol stack module; synchronize with said handover target cell, and feed back a synchronization acknowledgement message to said terminal protocol stack module; reside in said handover target cell according to the system message of said handover target cell, feed back said residence acknowledgment message to said terminal protocol stack module; judge whether to continue said PS handover or not according to a parameter contained in said handover request message and the currently stored TA value, and send said judgment result to said terminal protocol stack module; establish a physical channel with said handover target cell.

Alternatively, said physical layer module is configured to judge whether to continue said PS handover or not according to said parameter contained in said handover request message and the current stored TA value in the following manner:

when said handover type is an asynchronous handover, continuing said PS handover; when said handover type is a synchronous handover, continuing to judge whether the currently stored TA value exceeds said range of TA values or not, if the currently stored TA value does not exceed said range of TA values, continuing said PS handover; if the currently stored TA value exceeds said range of TA values, terminating said PS handover.

Alternatively, said terminal protocol stack module is further configured to include an identifier indicating whether said TA value is allowed to exceed said range or not into said handover request message sent to said physical layer module;

said physical layer module being configured to judge whether to continue said PS handover or not according to the parameter contained in said handover request message and the currently stored TA value in the following manner: when said handover type is an asynchronous handover, continuing said PS handover; when said handover type is a synchronous handover, first judging whether said TA value is allowed to exceed said range or not, if said TA value is allowed to exceed said range, continuing said PS handover; if said TA value is not allowed to exceed said range, then judging whether said currently stored TA value exceeds said range of TA values or not, if said currently stored TA value does not exceed said range of TA values, then continuing said PS handover; if the currently stored TA value exceeds said range of TA values, terminating said PS handover.

Alternatively, if the currently stored TA value of the physical layer module is equal to the TA value sent by said terminal protocol stack module to said physical layer module via said handover request message;

when said handover request message does not comprise the TA value, the currently stored TA value of said physical layer module is equal to 1.

Alternatively, said terminal protocol stack module is further configured to, when said judgment result is to terminate said PS handover, reconfigure said physical layer module according to the TA value of said terminal in said handover source cell and the power control parameter.

Alternatively, said physical layer module is further configured to, at the same time of releasing said physical channel with said current cell, report the TA value in the current cell and the power control parameter to said terminal protocol stack module;

said terminal protocol stack module is further configured to: save the TA value in the current cell and the power control parameter reported by said physical layer module, and configure said physical layer module in accordance with said stored TA value and said power control parameter.

The embodiment of the present document further provides a GSM terminal, comprising the abovementioned system.

The technical solution for the terminal achieving a cell handover uses operations similar to the process for the existing terminal achieving the cell reselection: synchronizing the physical layer with said handover target cell, and residing in said handover target cell, so that the cell handover process of the present application can use the existing cell reselection platform, which has relatively small change to the existing terminal communication process, whose implementation is simple; in addition, in order to ensure that the handover is not perceptible to users, the system message of the handover target cell needed by the terminal in the abovementioned technical scheme to reside in said handover target cell does not need to be acquired by the terminal through interactions with the handover target cell, thus reducing the residing time, meanwhile, the time taken by the handover request process added within the terminal by the abovementioned technical scheme is in the unit of milliseconds, and the resulting-in delay time cannot be perceived by the users.

PREFERRED EMBODIMENTS OF THE PRESENT DOCUMENT

Hereinafter with combination to the accompanying figures, the embodiments of the present document will be described in detail. It should be noted that, in the case of no conflict, the embodiments and features in the embodiments of the present application may be arbitrarily combined with each other.

Figure 1:
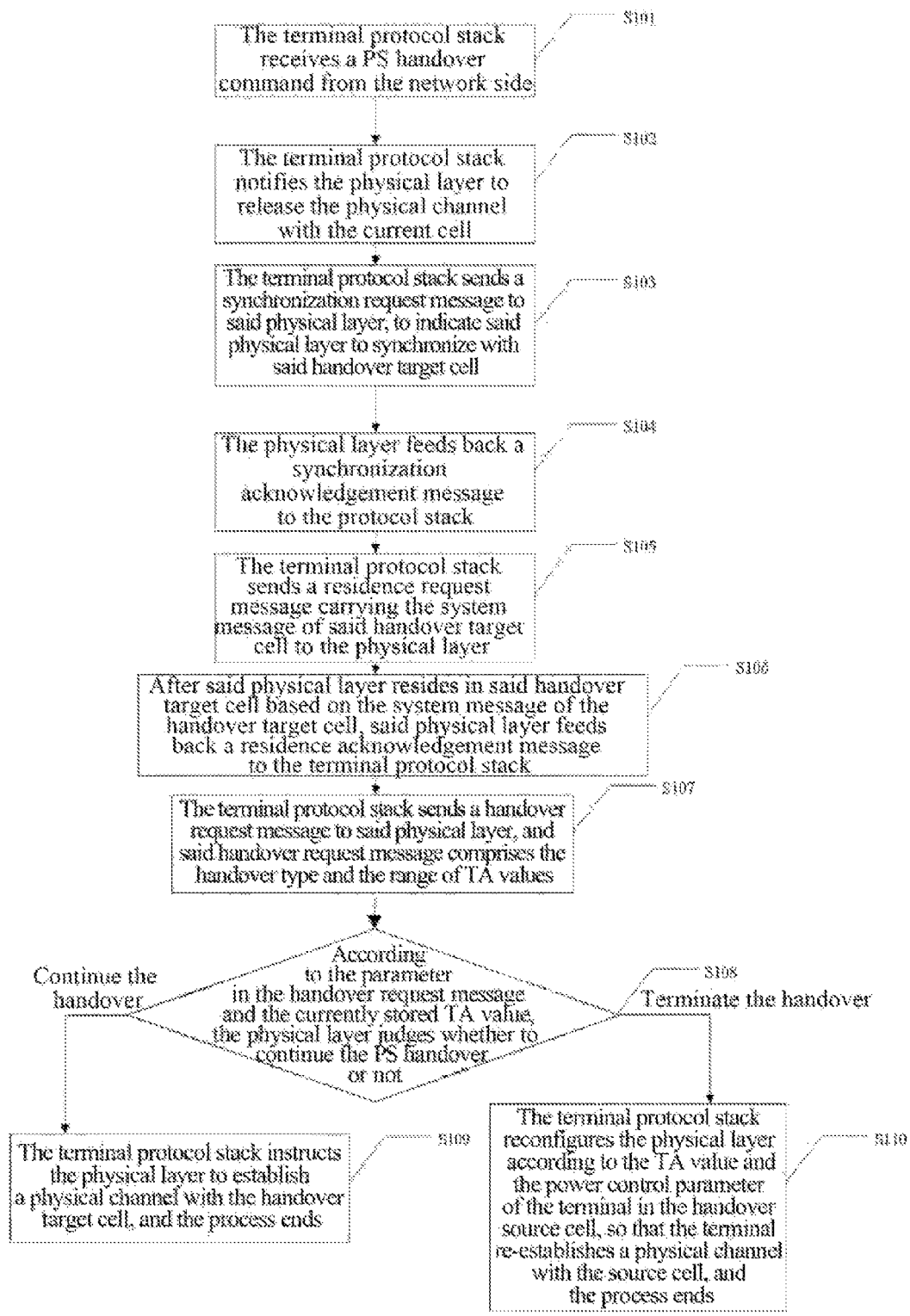
FIG. 1 is a flow chart of a packet switching (PS) domain handover method for a GSM terminal in accordance with an embodiment.

FIG. 1 is a flow chart of a packet switching (PS) domain handover method for a GSM terminal in accordance with the present embodiment.

The terminal needs to support the packet flow context (PFC) process in order to support the PS service.

S101. The terminal protocol stack receives a PS handover command from the network side.

Said terminal protocol stack receives said PS handover command in the packet transfer mode (PTM);

S102. Said terminal protocol stack notifies said physical layer to release the physical channel with the current cell.

Said physical channel may be a temporary block flow (TBF).

Said physical layer can report the timing advance (TA) value and the power control parameter in the current cell to said terminal protocol stack at the same time of releasing the physical channel with said current cell, for example, said physical layer reports the TA value and the power control parameter in the current cell to said terminal protocol stack through a callback function.

S103. Said terminal protocol stack sends a synchronization request message to said physical layer, to indicate said physical layer to synchronize with said handover target cell.

S104. Said physical layer feeds back a synchronization acknowledgement message to the protocol stack.

S105. Said terminal protocol stack sends a residence request message to said physical layer, and said residence request message carries the system message of said handover target cell from said network side.

The system message of said handover target cell can be sent by said network side to said terminal protocol stack through said PACKET NEIGHBOUR CELL DATA message.

By sending the system message of said handover target cell to the physical layer, it saves the time for the physical layer interacting with said target cell to acquire the system message of said target cell, so as to meet the requirements of said PS handover on time.

S106. After said physical layer resides in said handover target cell based on the system message of said handover target cell, it feeds back a residence acknowledgement message to said terminal protocol stack.

S107. Said terminal protocol stack sends a handover request message to said physical layer, and said handover request message comprises the handover type and the range of TA values.

S108. According to the parameter in said handover request message and the currently stored TA value, said physical layer judges whether to continue said PS handover or not, and sends a judgment result to said terminal protocol stack, when the judgment result is to continue said PS handover, proceed to step S109; when said judgment result is to terminate said PS handover, proceed to step S110.

Figure 2:
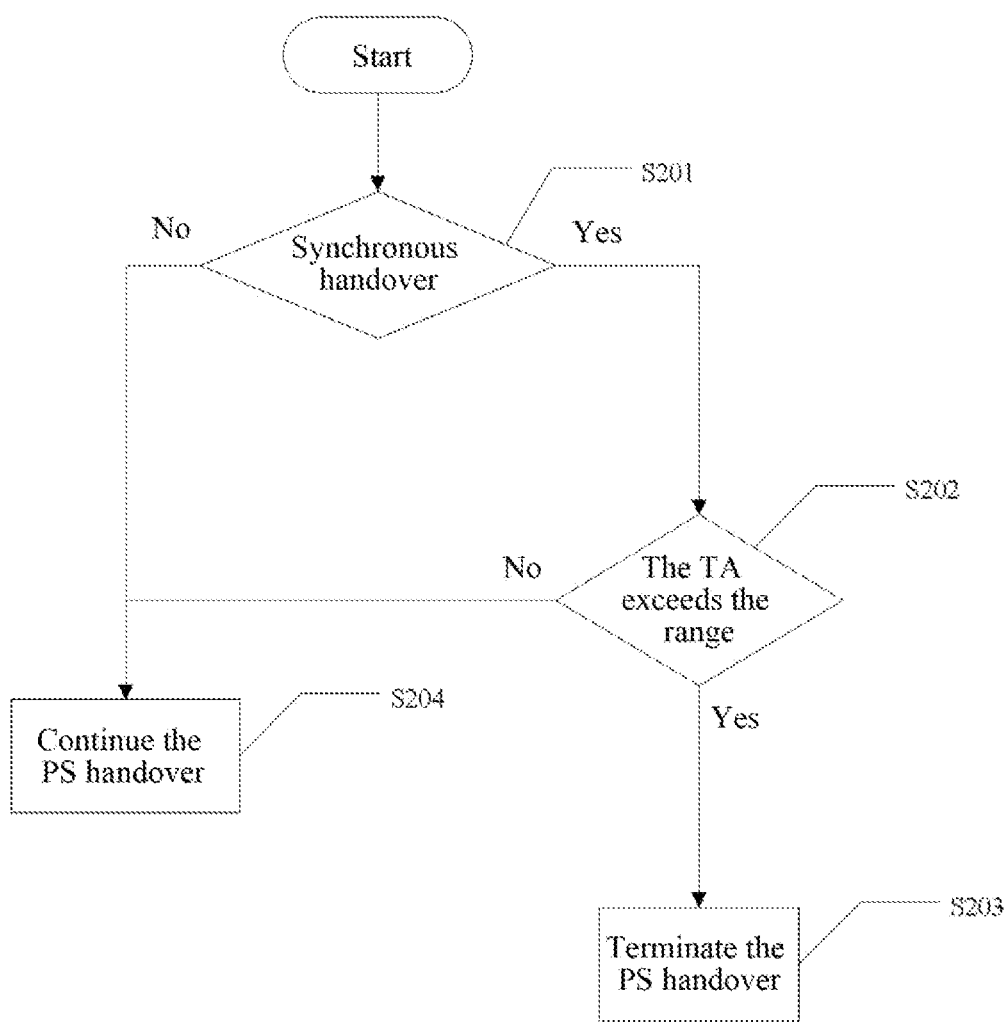
FIG. 2 is a flow chart of a physical layer judging whether to continue a PS handover or not in accordance with a parameter contained in said handover request message and a currently stored TA value in accordance with the present embodiment.

The specific judgment process is shown in FIG. 2:

S201. Judge whether said handover type is a synchronous handover or not, if yes, proceed to step S202; otherwise, proceed to step S204.

S202. Judge whether the currently stored TA value exceeds the range of TA values or not, and if it does not exceed the range of TA values, proceed to step S204; if it exceeds the range of TA values, proceed to step S203.

S203. Terminate the PS handover, and end the judgment process.

S204. Continue the PS handover, and end the judgment process.

Figure 3:
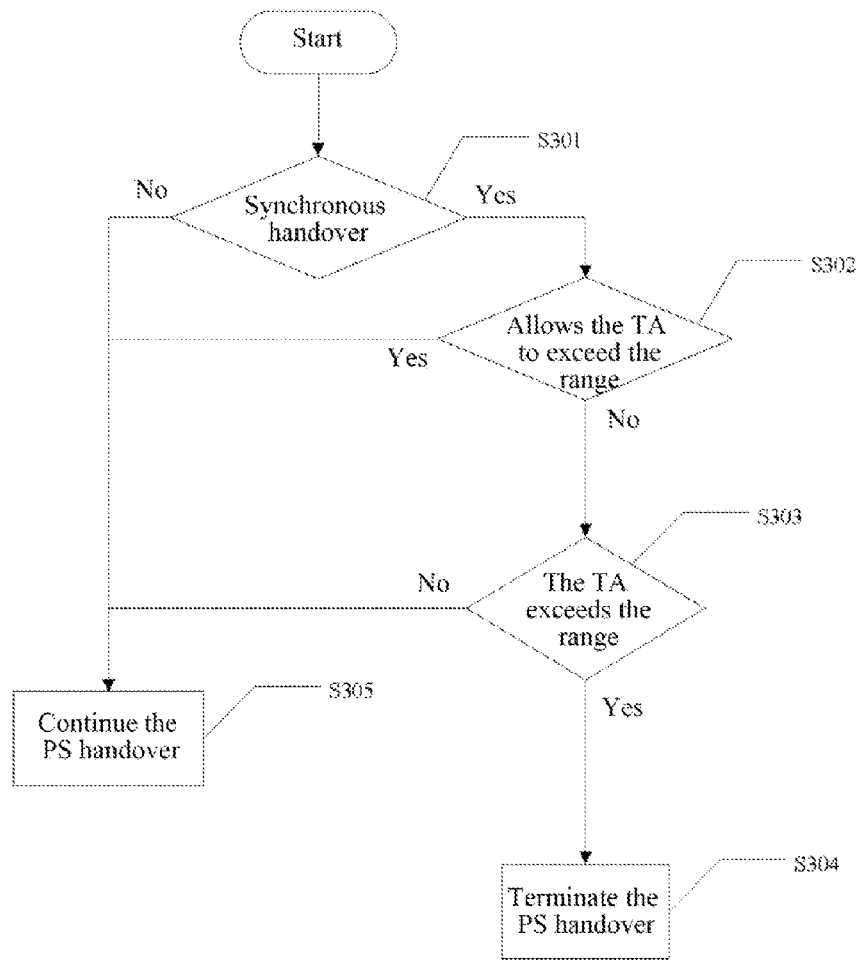
FIG. 3 is another flow chart of a physical layer judging whether to continue the PS handover or not in accordance with the parameter contained in the handover request message and the currently stored TA value in accordance with the present embodiment.

In other embodiments, besides of the handover type and the range of TA values, said handover request message sent by said terminal protocol stack to said physical layer may further comprise an identifier indicating whether said TA value is allowed to exceed the range or not, and at this time, the judgment process of the physical layer is shown in FIG. 3:

S301. Judge whether the handover type is a synchronous handover or not, if yes, proceed to step S302; otherwise, proceed to step S305.

S302. Judge whether the TA value is allowed to exceed said range or not, if the TA value is allowed to exceed the range, proceed to step S305; if the TA value is not allowed to exceed the range, proceed to step S303.

S303. Judge whether the currently stored TA value exceeds the range of TA values or not, if it does not exceed said range of TA values, proceed to step S305; if it exceeds said range of TA values, proceed to step S304.

S304. Terminate the PS handover, and end the judgment process.

S305. Continue the PS handover, and end the judgment process.

The currently stored TA value of the physical layer is equal to the TA value sent by said terminal protocol stack to the physical layer via said handover request message; if said handover request message does not comprise the TA value, the physical layer sets its currently stored TA value being equal to 1.

S109. The terminal protocol stack instructs the physical layer to establish a physical channel with the handover target cell, and the process ends.

For a synchronous handover, when the physical layer establishes a TBF with the new cell, it does not need to send a RACH to apply for a signaling channel, since the configuration information of said signaling channel is already included in the handover command sent by the network layer to the protocol stack, and said protocol stack sends it to the physical layer through the channel configuration message in the handover process.

S110. Said terminal protocol stack reconfigures the physical layer according to the TA value and the power control parameter of the terminal in the handover source cell, so that the terminal re-establishes a physical channel with the source cell, and the process ends.

If said terminal protocol stack saves the TA value and the power control parameter of the terminal in the handover source cell, said terminal protocol stack can configure the physical layer directly in accordance with said saved value and parameter. Since whether it successfully returns back to the source cell or not after the PS handover failure has a direct relationship with the TA value and the power control parameter of the terminal in the handover source cell that are stored in the terminal protocol stack, if the stored TA value and the power control parameter of the terminal in the handover source cell are too old, it increases the probability of failure of returning back to the source cell, while in the present embodiment, at the same time of releasing the physical channel with the current cell, the physical layer reports the TA value and the power control parameter in the current cell to said terminal protocol stack, so as to ensure that the information saved in the terminal protocol stack is up to date, greatly improving the success rate of the terminal's returning-back.

Figure 4:
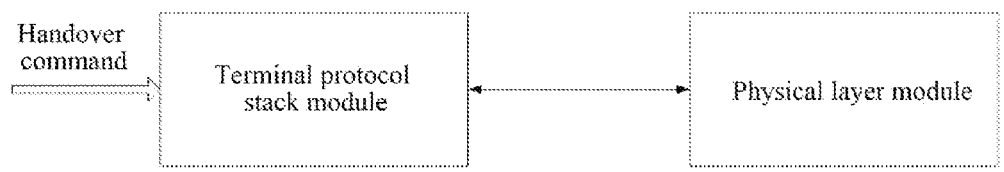
FIG. 4 is a composition diagram of a packet switched (PS) domain handover system for a GSM terminal in accordance with the present embodiment.

FIG. 4 is a composition diagram of a packet switching (PS) domain handover system for a GSM terminal in accordance with the present embodiment.

Said system comprises a terminal protocol stack module and a physical layer module, wherein said terminal protocol stack module is configured to, after receiving a handover command from the network side, notify said physical layer module to release the physical channel with the current cell; and after knowing that said physical layer module releases the physical channel with said current cell, send a synchronization request message to said physical layer module, to instruct said physical layer module to synchronize with the handover target cell; after receiving a synchronization acknowledgment message from said physical layer module, send a residence request message to said physical layer module, said residence request message carries the system message of the handover target cell from said network side; receive a residence acknowledgment message fed back by said physical layer module; after receiving the residence acknowledgement message sent by said physical layer module, send a handover request message to said physical layer module, and said handover request message comprises the handover type and the range of TA values; receive the judgment result fed back from said physical layer module about whether to continue the handover or not, and when said judgment result in to continue said PS handover, said terminal protocol stack module instructs said physical layer module to establish a physical channel with said handover target cell;

said physical layer module is configured to release the physical channel with the current cell, and notify the releasing result to said terminal protocol stack module; synchronize with the handover target cell, and feed back a synchronization acknowledgment message to said terminal protocol stack module; reside in the handover target cell according to the system message of said handover target cell, and feed back a residence acknowledgement message to said terminal protocol stack module; according to the parameter contained in the handover request message and the currently stored TA value, judge whether to continue said PS handover or not, and send the judgment result to said terminal protocol stack module; establish a physical channel with said handover target cell.

The abovementioned physical layer module may complete judging the PS handover according to the parameter in the handover request message and the currently stored TA value through the following steps:

said physical layer module is configured to, when said handover type is an asynchronous handover, continue said PS handover; when said handover type is a synchronization handover, continue to judge whether the currently stored TA value exceeds the range of TA values or not, if the currently stored TA value does not exceed said range of TA values, continue said PS handover; if the currently stored TA value exceeds said range of TA values, terminate said PS handover.

If the handover request message sent by said terminal protocol stack module to said physical layer module further comprises an identifier indicating whether said TA value is allowed to exceed said range or not, appropriately change can be made on the abovementioned step of said physical layer module judging the PS handover based on the parameter contained in said handover request message and the currently stored TA value, as follows:

said physical layer module is further configured to, when the handover type is a synchronous handover, first judge whether said TA value is allowed to exceed said range or not, if said TA value is allowed to exceed said range, continue said PS handover; if said TA value is not allowed to exceed said range, then judge whether the currently stored TA value exceeds the range of TA values or not, when the currently stored TA value does not exceed the range of TA values, continue said PS handover; if the currently stored TA value exceeds said range of TA values, terminate said PS handover.

The currently stored TA value of the physical layer module is equal to the TA value sent by said terminal protocol stack module to said physical layer module through said handover request message; when said handover request message does not comprise said TA value, the currently stored TA value of said physical layer module is equal to 1.

If the judgment result received by said terminal protocol stack module from said physical layer module is to terminate said PS handover, said terminal protocol stack module is further configured to reconfigure said physical layer module in accordance with the TA value and the power control parameter of the terminal in said handover source cell.

The physical layer module reports the TA value of the terminal in said handover source cell and the power control parameter to the terminal protocol stack module to save at the same time releasing the physical channel with said current cell; said terminal protocol stack module configures said physical layer module according to the stored TA value in the current cell and power control parameter reported by said physical layer module.

Those ordinarily skilled in the art can understand that all or some of steps in the abovementioned method may be completed by the programs instructing the relevant hardware, and said programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiment may be realized in the form of hardware or software function module. The embodiment of the present document is not limited to any specific form of hardware and software combinations.

It should be noted that, the present document can also have a variety of other embodiments, and without departing from the spirit and essence of the present document, a person skilled in the art may make various changes and modifications according to the embodiments of the present document, and these corresponding changes and modifications shall belong to the protection scope of the appended claims of the present document.

INDUSTRIAL APPLICABILITY

The technical solution for the terminal achieving a cell handover uses operations similar to the process for the existing terminal achieving the cell reselection: synchronizing the physical layer with said handover target cell, and residing in said handover target cell, so that the cell handover process of the present application can use the existing cell reselection platform, which has relatively small change to the existing terminal communication process, whose implementation is simple; in addition, in order to ensure that the handover is not perceptible to users, the system message of the handover target cell needed by the terminal in the abovementioned technical scheme to reside in said handover target cell does not need to be acquired by the terminal through interactions with the handover target cell, thus reducing the residing time, meanwhile, the time taken by the handover request process added within the terminal by the abovementioned technical scheme is in the unit of milliseconds, and the resulting-in delay time cannot be perceived by the users.

What we claim is:

1. A packet switching (PS) domain handover method for a GSM terminal, wherein, said method comprising:
    after a terminal protocol stack receiving a handover command from a network side, notifying a physical layer to release a physical channel with a current cell;
    said terminal protocol stack sending a synchronization request message to said physical layer to instruct said physical layer to synchronize with a handover target cell;
    after receiving a synchronization acknowledgement message from said physical layer, said terminal protocol stack sending a residence request message to said physical layer, and said residence request message carrying a system message of said handover target cell from said network side;
    after residing in said handover target cell based on said system message of said handover target cell, said physical layer feeding back a residence acknowledgement message to said terminal protocol stack;
    after receiving the residence acknowledgement message sent by said physical layer, said terminal protocol stack sending a handover request message to said physical layer, and said handover request message comprising a handover type and a range of time advancing (TA) values;
    said physical layer judging whether to continue said PS handover or not according to a parameter contained in said handover request message and a currently stored TA value, and sending a judgment result to said terminal protocol stack;
    when said judgment result is continuing said PS handover, said terminal protocol stack instructing said physical layer to establish a physical channel with said handover target cell;
    wherein,
    said handover request message further comprising an identifier indicating whether to allow to exceed said range of TA values or not;
    the step of said physical layer judging whether to continue said PS handover or not according to said parameter contained in said handover request message and the currently stored TA values comprising:
    if said handover type is an asynchronous handover, continuing said PS handover;
    if said handover type is a synchronous handover, judging whether said TA value is allowed to exceed said range or not, if said TA value is allowed to exceed said range, continuing said PS handover; if said TA value is not allowed to exceed said range, then judging whether said currently stored TA value exceeds said range of TA values or not, if said currently stored TA value does not exceed said range of TA values, continuing said PS handover; if said currently stored TA value exceeds said range of TA values, terminating said PS handover.

2. The method of claim 1, wherein,
    the step of said physical layer judging whether to continue said PS handover or not according to said parameter contained in said handover request message and the currently stored TA value comprising:
    if said handover type is an asynchronous handover, continuing said PS handover;
    if said handover type is a synchronous handover, judging whether the currently stored TA value exceeds said range of TA values or not, if said currently stored TA value does not exceed the range of TA values, continuing said PS handover; if the currently stored TA value exceeds said range of TA values, terminating said PS handover.

3. The method of claim 2, wherein,
    said currently stored TA value of said physical layer being equal to the TA value sent by said terminal protocol stack to said physical layer via said handover request message;
    when said handover request message does not comprise said TA value, the currently stored TA value of said physical layer being equal to 1.

4. The method of claim 1, wherein, when said judgment result is terminating said PS handover, said method further comprising:
    said terminal protocol stack reconfiguring said physical layer according to said TA value and a power control parameter of said terminal in a handover source cell.

5. The method of claim 4, wherein, said method further comprising:
    said physical layer receiving a notification from said terminal protocol stack and releasing said physical channel with said current cell, at the same time said physical layer reporting the TA value and said power control parameter of said current cell to said terminal protocol stack; said terminal protocol stack saving the TA value and said power control parameter of said current cell;
    when said judgment result is terminating said PS handover, said terminal protocol stack configuring said physical layer in accordance with the stored TA value and said power control parameter.

6. The method of claim 1, wherein,
    said currently stored TA value of said physical layer being equal to the TA value sent by said terminal protocol stack to said physical layer via said handover request message;
    when said handover request message does not comprise said TA value, the currently stored TA value of said physical layer being equal to 1.

7. A packet switching (PS) domain handover system, applied for a GSM terminal, and said system comprising: a terminal protocol stack module and a physical layer module, wherein, said terminal protocol stack module being configured to: after receiving a handover command from a network side, notify said physical layer module to release a physical channel with a current cell; as well as after knowing that said physical layer module releases said physical channel with said current cell, send said physical layer module a synchronization request message indicating said physical layer module to synchronize with said handover target cell; after receiving a synchronization acknowledgement message from said physical layer module, send a residence request message to said physical layer module, wherein said residence request message carrying a system message of said handover target cell from said network side; receive a residence acknowledgment message fed back from said physical layer module; after receiving said residence acknowledgment message sent by said physical layer module, send a handover request message to said physical layer module, and said handover request message comprising a handover type and a range of TA values; receive a judgment result fed back by said physical layer module about whether to continue said handover or not, and when said judgment result is to continue said PS handover, said terminal protocol stack module instructing said physical layer module to establish a physical channel with said handover target cell;

said physical layer module being configured to: release said physical channel with said current cell, and notify a releasing result to said terminal protocol stack module; synchronize with said handover target cell, and feed back a synchronization acknowledgement message to said terminal protocol stack module; reside in said handover target cell according to a system message of said handover target cell, feed back said residence acknowledgment message to said terminal protocol stack module; judge whether to continue said PS handover or not according to a parameter contained in said handover request message and the currently stored TA value, and send a judgment result to said terminal protocol stack module; establish a physical channel with said handover target cell;

wherein, said terminal protocol stack module being further configured to include an identifier indicating whether said TA value is allowed to exceed said range or not into said handover request message sent to said physical layer module;

said physical layer module being configured to judge whether to continue said PS handover or not according to the parameter contained in said handover request message and the currently stored TA value in the following manner: when said handover type is a asynchronous handover, continuing said PS handover; when said handover type is a synchronous handover, first judging whether said TA value is allowed to exceed said range or not, if said TA value is allowed to exceed said range, continuing said PS handover; if said TA value is not allowed to exceed said range, then judging whether said currently stored TA value exceeds said range of TA values or not, if said currently stored TA value does not exceed said range of TA values, then continuing said PS handover; if the currently stored TA value exceeds said range of TA values, terminating said PS handover.

8. The system of claim 7, wherein, said physical layer module being configured to judge whether to continue said PS handover or not according to said parameter contained in said handover request message and the current stored TA value in the following manner:

when said handover type is an asynchronous handover, continuing said PS handover; when said handover type is a synchronous handover, continuing to judge whether the currently stored TA value exceeds said range of TA values or not, if the currently stored TA value does not exceed said range of TA values, continuing said PS handover; if the currently stored TA value exceeds said range of TA values, terminating said PS handover.

9. The system of claim 8, wherein, the currently stored TA value of the physical layer module being equal to the TA value sent by said terminal protocol stack module to said physical layer module via said handover request message;

when said handover request message does not comprise the TA value, the currently stored TA value of said physical layer module being equal to 1.

10. The system of claim 7, wherein, said terminal protocol stack module being further configured to, when said judgment result is to terminate said PS handover, reconfigure said physical layer module according to said TA value and a power control parameter of said terminal in said handover source cell.

11. The system of claim 10, wherein, said physical layer module being further configured to, at the same time of releasing said physical channel with said current cell, report said TA value and said power control parameter of the current cell to said terminal protocol stack module;

said terminal protocol stack module being further configured to: save the TA value and the power control parameter of the current cell reported by said physical layer module, and configure said physical layer module in accordance with said stored TA value and said power control parameter.

12. The system of claim 7, wherein, the currently stored TA value of the physical layer module being equal to the TA value sent by said terminal protocol stack module to said physical layer module via said handover request message;

when said handover request message does not comprise the TA value, the currently stored TA value of said physical layer module being equal to 1.

13. A GSM terminal, comprising a packet switching (PS) domain handover system, wherein said system comprises: a terminal protocol stack module and a physical layer module, wherein, said terminal protocol stack module being configured to: after receiving a handover command from a network side, notify said physical layer module to release a physical channel with a current cell; as well as after knowing that said physical layer module releases said physical channel with said current cell, send said physical layer module a synchronization request message indicating said physical layer module to synchronize with said handover target cell; after receiving a synchronization acknowledgement message from said physical layer module, send a residence request message to said physical layer module, wherein said residence request message carrying a system message of said handover target cell from said network side; receive a residence acknowledgement message fed back from said physical layer module; after receiving said residence acknowledgment message sent by said physical layer module, send a handover request message to said physical layer module, and said handover request message comprising a handover type and a range of TA values; receive a judgment result fed back by said physical layer module about whether to continue said handover or not, and when said judgment result is to continue said PS handover, said terminal protocol stack module instructing said physical layer module to establish a physical channel with said handover target cell;

said physical layer module being configured to: release said physical channel with said current cell, and notify a releasing result to said terminal protocol stack module; synchronize with said handover target cell, and feed back a synchronization acknowledgement message to said terminal protocol stack module; reside in said handover target cell according to a system message of said handover target cell, feed back said residence acknowledgment message to said terminal protocol stack module; judge whether to continue said PS handover or not according to a parameter contained in said handover request message and the currently stored TA value, and send a judgment result to said terminal protocol stack module; establish a physical channel with said handover target cell;

wherein, said terminal protocol stack module being further configured to include an identifier indicating whether said TA value is allowed to exceed said range or not into said handover request message sent to said physical layer module;

said physical layer module being configured to judge whether to continue said PS handover or not according to the parameter contained in said handover request message and the currently stored TA value in the following manner: when said handover type is an asynchronous handover, continuing said PS handover; when said handover type is a synchronous handover, first judging whether said TA value is allowed to exceed said range or not, if said TA value is allowed to exceed said range, continuing said PS handover; if said TA value is not allowed to exceed said range, then judging whether said currently stored TA value exceeds said range of TA values or not, if said currently stored TA value does not exceed said range of TA values, then continuing said PS handover; if the currently stored TA value exceeds said range of TA values, terminating said PS handover.

14. A GSM terminal of claim 13, wherein, said physical layer module being configured to judge whether to continue said PS handover or not according to said parameter contained in said handover request message and the current stored TA value in the following manner:

when said handover type is an asynchronous handover, continuing said PS handover; when said handover type is a synchronous handover, continuing to judge whether the currently stored TA value exceeds said range of TA values or not, if the currently stored TA value does not exceed said range of TA values, continuing said PS handover; if the currently stored TA value exceeds said range of TA values, terminating said PS handover.

15. A GSM terminal of claim 14, wherein, the currently stored TA value of the physical layer module being equal to the TA value sent by said terminal protocol stack module to said physical layer module via said handover request message;

when said handover request message does not comprise the TA value, the currently stored TA value of said physical layer module being equal to 1.

16. A GSM terminal of claim 13, wherein, said terminal protocol stack module being further configured to, when said judgment result is to terminate said PS handover, reconfigure said physical layer module according to said TA value and a power control parameter of said terminal in said handover source cell.

17. A GSM terminal of claim 16, wherein, said physical layer module being further configured to, at the same time of releasing said physical channel with said current cell, report said TA value and said power control parameter of the current cell to said terminal protocol stack module;

said terminal protocol stack module being further configured to: save the TA value and the power control parameter of the current cell reported by said physical layer module, and configure said physical layer module in accordance with said stored TA value and said power control parameter.

* * * * *